Jan. 2, 1962     R. J. HENGEL     3,015,413
ORIENTING AND FEEDING DEVICE
Filed June 25, 1958     4 Sheets-Sheet 1
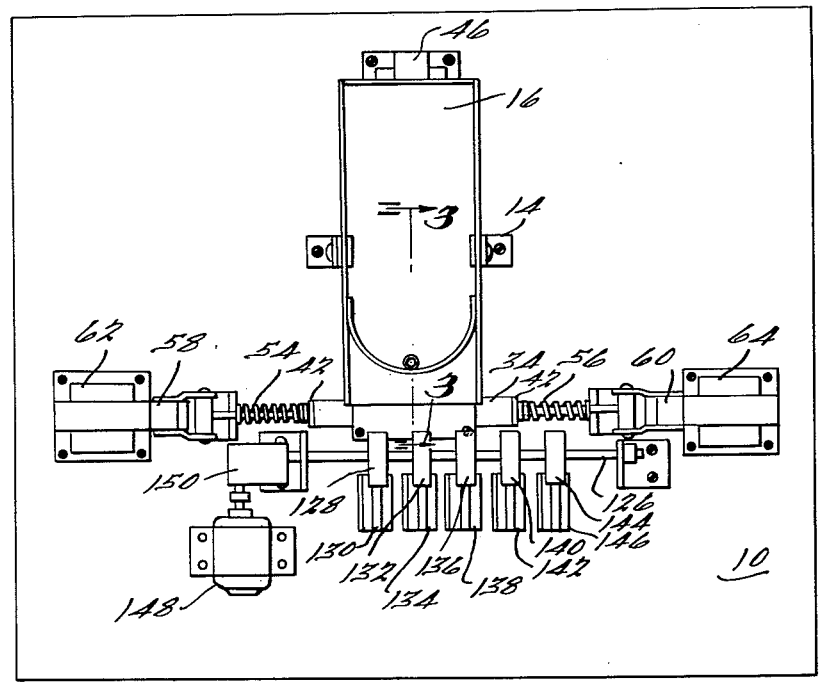
FIG. 1.
FIG. 2.
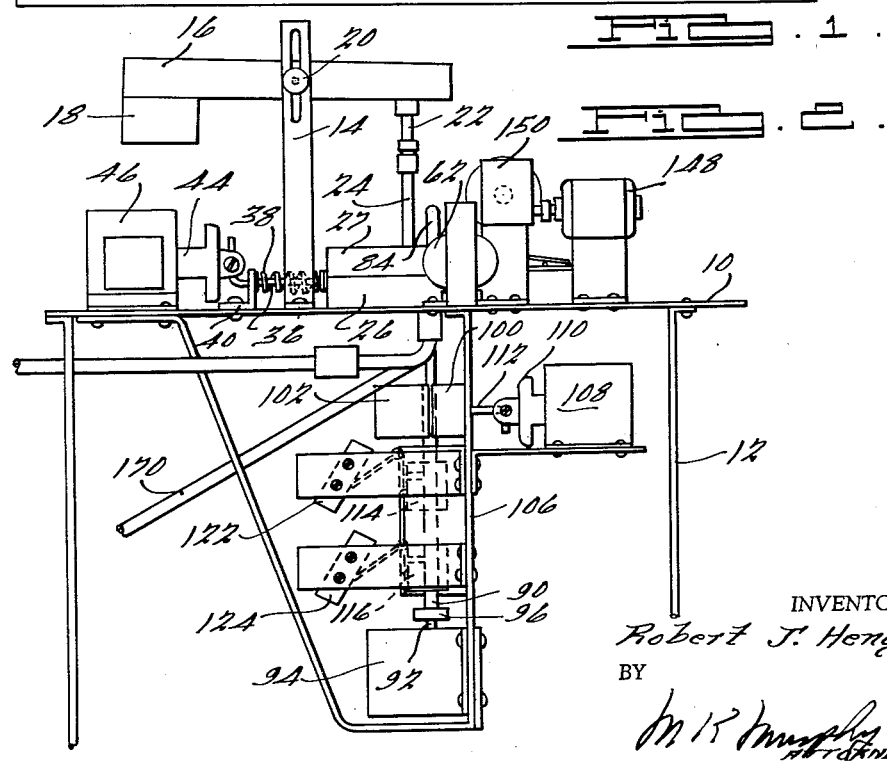
INVENTOR.
Robert J. Hengel
BY
*M. R. Murphy*
ATTORNEY

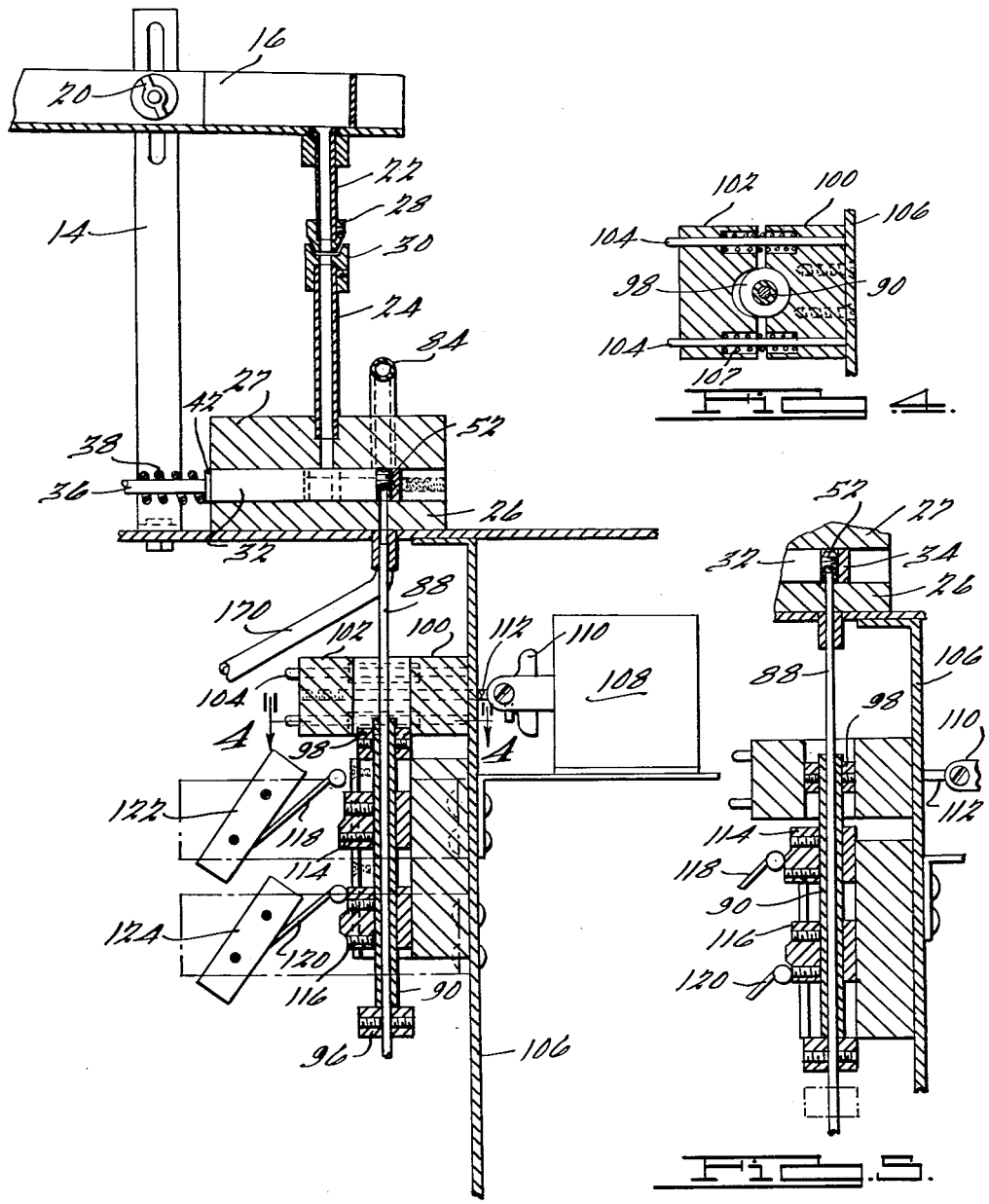

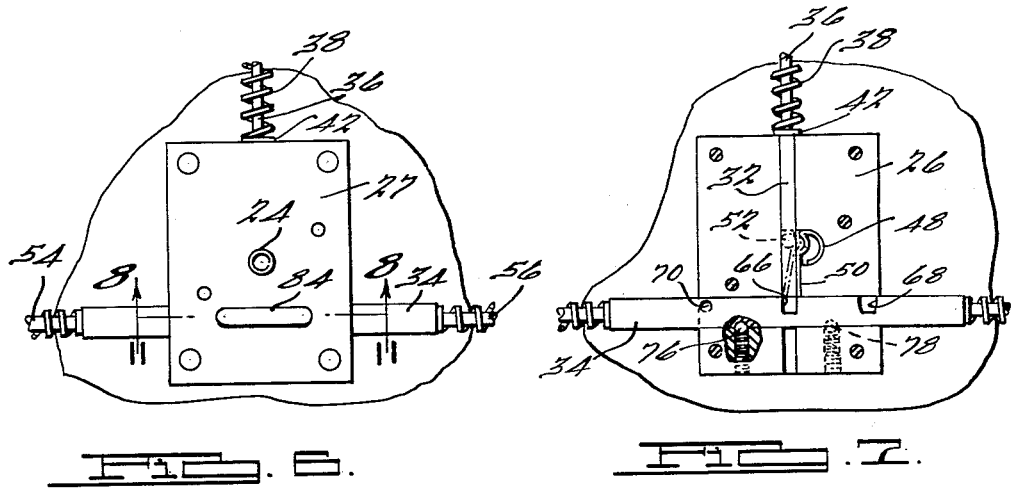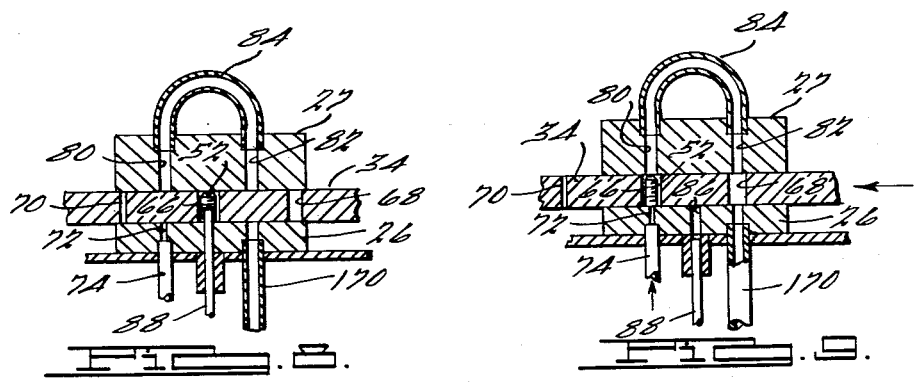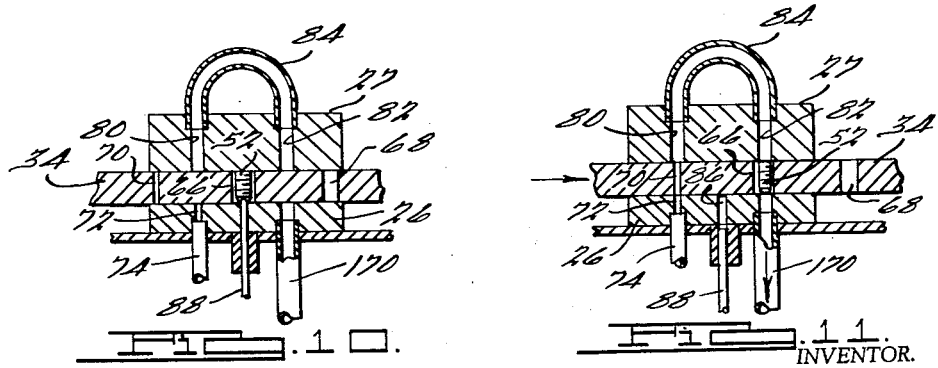

Jan. 2, 1962 R. J. HENGEL 3,015,413
ORIENTING AND FEEDING DEVICE
Filed June 25, 1958 4 Sheets-Sheet 4

INVENTOR.
Robert J. Hengel.
BY
M. K. Murphy
ATTORNEY.

United States Patent Office 3,015,413
Patented Jan. 2, 1962

3,015,413
ORIENTING AND FEEDING DEVICE
Robert J. Hengel, 2167 Shankin, Walled Lake, Mich.
Filed June 25, 1958, Ser. No. 744,579
6 Claims. (Cl. 221—9)

This invention relates to an improved orienting and feeding device for small machine parts such as screws, and particularly headless socket head set screws.

There are many devices on the market for orienting screws and like parts by detecting differences in diameter, weight or shape of head. Headless screws, however, present a more difficult problem since there is only slight difference in weight between ends and there is no head for the orientation device to sense.

It is, therefore, the principal object of my invention to provide an improved orientation and feeding device for screws, and headless set screws in particular, which incorporates means for feeling or probing the screw to determine whether it is correctly oriented and, if not, reversing the screw 180 degrees by simple means.

Another object is to provide means for electro-mechanically probing the screw and for electro-pneumatically orienting and feeding the screw.

Other objects and advantages of my invention will become clear from the following specification which, taken in conjunction with the accompanying drawings, discloses a preferred form of the device.

In the drawings in which reference characters have been used to designate like parts referred to in the following description:

FIG. 1 is a plan view of the machine;
FIG. 2 is a side elevation of the same;
FIG. 3 is a section on line 3—3 of FIG. 1;
FIG. 4 is a section on the line 4—4 of FIG. 3;
FIG. 5 is an enlarged detail section of the apparatus shown in FIG. 3, but showing the parts in a different position of operation;
FIG. 6 is a plan view of the orienting mechanism;
FIG. 7 is a view similar to FIG. 6, but with the cover removed to show the internal mechanism;
FIGS. 8 to 11 inclusive, are sectional views taken along line 8—8 of FIG. 6, showing one of the ram members in different positions of operation;
FIG. 12 is a schematic wiring diagram of the machine; and
FIG. 13 is a time-degree diagram of the cam operation which controls the sequence of operations of the machine.

For convenience, I have shown my device mounted on a bench 10 having supports 12, but any suitable mounting may be used. Mounted on the bench by means of uprights 14 is a hopper 16 for containing the screws. A vibrator 18 of any suitable type is provided for feeding the screws, and the inclination of the hopper is adjustable by loosening the thumb screws 20.

The screws are fed into the orientator through a tube 22 carried by the hopper. This tube feeds into a second tube 24 carried by the base 26 of the orientator through a coupling which permits the hopper to vibrate. The coupling comprises a male member 28 carried by the tube 22 and a female member 30 carried by the tube 24. FIG. 3 shows the members in section, and it is believed that their function is apparent.

The block member 26 constitutes the body of the orientator in which the screw is probed to determine its position. Referring now particularly to FIGS. 2, 3 and 5–11 inclusive, it may be seen that the part 26 is provided with perpendicularly disposed slots in which are disposed rams 32 and 34. The ram 32 has a rod extension 36 which carries a coil spring 38, the latter being compressed between an angle bracket 40 (FIG. 2) and a washer 42 which abuts the rectangular end portion of the ram. The ram 32 is urged by the spring 38 into its forward position as shown in FIG. 7, and the rod 36 is attached at its rear end (FIG. 2) to the plunger 44 of a solenoid 46 which functions to withdraw the ram against spring pressure as will be explained.

The block 26 is suitably machined to accommodate a leaf spring 48 (FIG. 7). This spring has a curved portion which nests in the rounded slot shown and a leg portion 50 which springs into the ram slot (as shown in the broken lines) when the ram is withdrawn. When the ram moves forward to the FIG. 7 position, the spring leg is moved out of the way and lies in an accommodating slot as shown in the full lines. The purpose and function of the spring 48 is to make sure that a screw 52 that has dropped from the feed tube 24 into the ram slot ahead of ram 32, when the latter is in its withdraw position, will be retained in upright position as it is engaged by the ram and moved forwardly. The spring 48 prevents jamming of the mechanism due to cocked screws.

The other slot in the block 26 accommodates the second ram 34. The latter is also rectangular in section and extends outwardly of the block at each end. A pair of rod extensions 54, 56, are threadedly attached to the ends of the ram 34, and these rods are operatively attached to plungers 58, 60, of solenoids 62, 64, respectively.

The ram 34 has a pair of slots 66, 68, each of which is adapted to receive a screw, such as the screw 52, under certain conditions. In addition, the ram 34 has a through hole 70 which, under certain operating conditions is aligned with a hole 72 in the block 26. The latter is connected by a pipe or conduit 74 with a source of compressed air. A pair of spring pressed detents 76, 78 (FIG. 7) engage the ram 34 when the latter is in its normal or screw-receiving position, and tend to center the ram such that the screw-receiving slot 66 will be accurately aligned with the ram slot.

The block 26 has a cover 27 which is provided with passages 80, 82. A U-shaped tube 84 connects these passages as shown. These passages and tube function to reverse the position of the screw 52 if it is not in correctly oriented position as will be hereinafter explained.

The block 26 is also provided with an opening 86 through which a probe member 88 reciprocates. The probe 88 consists of an elongated rod which is surrounded for a portion of its length by a tube 90. Both the rod 88 and tube 90 are movable upwardly by the plunger 92 of a solenoid 94, but the rod is movable with respect to the tube. As is more clearly shown in FIG. 3, the rod 88 carries a collar 96 on which the tube 90 rests. Upward movement of the plunger 92 will cause upward movement of both the rod and tube, but the plunger and rod will return by gravity when the solenoid is de-energized, whereas the tube may be retained in elevated position.

The holding means for the tube is shown in FIGS. 3, 4 and 5. As can be seen, the tube 90 carries a collar 98 which is loosely disposed between clamping blocks 100, 102. The block 100 is fixed to the downwardly extending member 106 on which the probe operating mechanism is carried. The block 102 is slidably carried on rods 104, and the two blocks are normally spaced apart by springs 107. The blocks have complementary semi-circular cut-out portions which are adapted to engage and grip the collar 98 when the blocks are drawn together. The block 102 is adapted to be moved on the rods or pins 104 by means of a solenoid 108. The latter has a plunger 110 which is fastened to a rod 112 (FIG. 3). The latter passes loosely through the wall 106 and the block 100, to one side of the openings which accommodate the probe, and threadedly engages the block 102. Energization of the solenoid 108 will draw the block 102 into holding engagement with the collar 98 and will thus hold the tube 90 against movement allowing the probe rod 88 to move downwardly independently thereof.

Also carried by the tube 90 are two switch operating cams 114, 116, which, upon upward movement of the tube 90, operate switch arms 118, 120, of micro switches 122, 124.

To control the sequence of operations of the device automatically, I provide a cam shaft 126 which carries cams 128, 132, 136, 140 and 144, which respectively actuate the micro switches 130, 134, 138, 142 and 146 (FIGS. 1 and 12). The cam shaft 126 is suitably mounted on the machine and is driven by a motor 148 through a speed reducing gearbox 150.

Operation of the machine as a whole will now be explained with particular reference to the wiring diagram of FIG. 12 and the cam time-sequence diagram of FIG. 13.

Let it be assumed that the hopper 16 contains a quantity of socket-head set screws of the type shown and designated by reference numeral 52. The vibrator 18 and the cam drive motor 148 are energized, these units being continuously operative. When a screw drops, it will rest on top of the ram 32, the latter being in the FIG. 7 position to which it is urged by spring 38. When the riser of cam 140 closes the micro-switch 142, the switch arm will connect the line 152, which is one side of a conventional 110 volt A.C. supply, to line 154 leading to solenoid 46. The latter is connected to line 158, which is the other side of the power supply, and upon energization, withdraws the ram 32 rearwardly of FIG. 7 such that the spring 48 will assume its dotted line position and the screw 52 will drop into the slot ahead of ram 32 where it will be held erect by the spring. From the cam time-degree diagram (FIG. 13), it will be seen that the solenoid 46 is energized about one and one-quarter seconds before zero time as indicated in the diagram. This is shown by the bottom line, labelled "ram 32." Furthermore it will be seen that the entire operating cycle of the machine is four seconds, during which time the cam shaft 126 makes one revolution.

The solenoid 46 is energized for a little more than a second which is ample time for the screw to drop into the slot whereupon the cam 140 breaks the circuit to solenoid 46 and allows the spring 38 to thrust the ram 32 forwardly to shove the screw 52 into slot 66 in ram 34.

After about 45° further rotation of the cam shaft, cam 136 closes switch 138 thereby connecting line 152 with line 156 leading to probe operating solenoid 94. The latter thrusts probe 88 upwardly until it contacts the screw 52. The screw 52 is shown in "upright" or "right side up" position in FIGS. 10, 11 and 12, and in "right side down" or "upside-down" position in FIGS. 8 and 9. Let us first consider what happens if the screw is in the upright position of FIG. 12.

The probe 88 will advance upwardly until it hits the point of the screw carrying along tube 90, whereupon switch cam 116 closes switch 124 thus connecting solenoid 62 to line 158 through lines 160, 162. Cam 132 then, after about 45° of rotation, closes switch 134 which connects the other side of solenoid 62 to line 152 through line 164. Meanwhile, cam 144 has closed switch 146, thus energizing solenoid 108 through lines 152, 166, 168 and 158, and probe operating solenoid 94 has become de-energized permitting probe 88 to drop out of contact with the screw. Energization of solenoid 108 has closed holding blocks 100, 102, and tube 90 is thus held in switch closing position.

Energization of solenoid 62 thrusts ram 34 toward the right (FIGS. 10 and 11), thus moving the screw 52 into position directly over feed tube 170 which leads to a power screwdriver or other automatic mechanism. At the same time, passage 70 is aligned with passage 72. At approximately the instant the screw arrives at its FIG. 11 position, cam 128 closes switch 130, thus energizing relay operated air valve switch 172, which opens the air valve and sends a blast of compressed air through tube 74, passages 72, 70 and 80, tube 84, passage 82 and slot 66. The screw 52 is thus impelled through the feed tube 170. The cycle is now ready for a repetition of the above described sequence.

If the probe 88 senses that the screw is reversed as shown in FIGS. 8 and 9, its upward advance will be greater because it enters the socket of the screw head and will be sufficient to close switch 122. Switch 124 will close and open again as a result of upward movement of cam 116, but no movement of ram 34 will occur because cam 132 has not closed switch 134. Closure of switch 122 will connect one side of solenoid 64 with lines 160 and 158 through lines 174, 176. When switch 134 closes (about 45° of rotation of shaft 126 later) the other side of solenoid 64 will be connected to line 152 through lines 164, 178.

Solenoid 64 will then thrust ram 34 toward the left from FIG. 8 to FIG. 9 position. The screw 52 will be moved into alignment with passages 72 and 80. The air blast through passage 72 will then blow the screw through tube 84, thereby turning it end for end, then through passage 82 and slot 68 into feed tube 170. The screw will thus be delivered for assembly in correct position.

It will thus be seen that I have provided a simple orienting and feeding device for small parts. While I have shown its operation in connection with socket-head set screws, it is by no means limited to such in use. Changes in the size, arrangement and sequence of operations may be made without departing from the spirit of my invention. For example, some types of parts will permit the cam operating sequence to be speeded up and the overlapping cam operations altered. The air supply in tube 74 may be continuously effective if desired, and the various solenoids may be operated by low-voltage switches and relays.

It will be seen, then, that it is not intended to limit the scope of the invention except as set forth in the appended claims.

I claim:
1. In a screw orienting device, a slide member having a slot for receiving a screw to be oriented, probe means operatively associated with said slide and operable to engage a screw in said slot for determining if said screw is in right side up or right side down position, means operatively associated with said probe and said slide for moving said slide in one direction or the opposite in response to determination of screw position by said probe, a discharge passage adapted to register with said slot in response to slide movement in one direction, and screw reversing means including a screw reversing tube adapted to register with said slot and with said discharge passage in response to slide movement in the opposite direction.

2. In a screw orienting device, a slide member having a slot for receiving a screw to be oriented, probe means operatively associated with said slide and operable to engage a screw in said slot for determining if said screw is in right side up or right side down position, a discharge passage adapted for communication with said slot in response to slide movement in one direction, and screw reversing means including a screw reversing tube adapted for communication with said slot and with said discharge passage in response to slide movement in the opposite direction, and automatically operable means for causing said slide to move in one direction or the opposite in response to the distance of probe movement.

3. The combination set forth in claim 2 including timing means for causing sequential operation of said slide and said probe, and switch means operable by said probe operatively associated with said timing means for determining the direction of movement of said slide.

4. In an orienting and feeding device for small parts having opposite surfaces differentiated by difference in contour, a feed hopper for receiving parts in random positions, an output tube for delivering parts in oriented positions, a block having an article receiving slot therein, means for feeding articles from said hopper into said slot in random positions, orienting means comprising a reciprocable slide having an article receiving recess therein disposed normally in registry with said slot, power operated means for moving an article from said slot into said recess, a probe operable to engage the article in said recess for determining whether said article is right side up or right side down, means operable in response to movement of said probe into engagement with an article in right side up position for moving said slide in such direction that the article is fed into said output tube, means operable in response to movement of said probe into engagement with an article in right side down position for moving said slide in the opposite direction, and means operable in response to movement of said slide in said opposite direction for turning said article end-for-end and feeding it into said output tube.

5. The combination of claim 4 wherein said turning means comprises a U-shaped tube having its receiving end disposed in registry with said recess when the latter is in position as a result of movement of said slide in said opposite direction and its outlet end in registry with said output tube, and fluid pressure means for propelling said articles through said tube.

6. In an orienting and feeding device for small parts having opposite surfaces differentiated by difference in contour, an orienting block, a slide member slideably disposed in said block, said slide member having a slot therein for receiving a part in random position, a probe, automatically operable means for moving said probe into engagement with one of said surfaces of said part after said part has been disposed in said slide member slot, said probe having two degrees of movement depending upon which of said surfaces is engaged, means operable automatically in response to the degree of movement of said probe for moving said slide member forwardly or rearwardly from probe engaging position, means for discharging the part from the device in response to movement of said slide member to forward position, and automatically operable means for reversing the position of said part and feeding it from the device in response to movement of said slide member to rearward position.

References Cited in the file of this patent
UNITED STATES PATENTS

| | | |
|---|---|---|
| 461,649 | Taintor et al. | Oct. 20, 1891 |
| 699,565 | Pugh | May 6, 1902 |
| 1,139,365 | O'Connor | May 11, 1915 |
| 2,211,511 | Melzer et al. | Aug. 13, 1940 |
| 2,382,863 | Decker et al. | Aug. 14, 1945 |
| 2,434,222 | Olivier | Jan. 6, 1948 |
| 2,649,178 | Payne | Aug. 18, 1953 |
| 2,742,134 | Boon | Apr. 17, 1956 |
| 2,759,631 | Ervine | Aug. 21, 1956 |
| 2,809,541 | Witt | Oct. 15, 1957 |
| 2,836,324 | Willis et al. | May 27, 1958 |
| 2,845,164 | Stahl | July 29, 1958 |